United States Patent
Hara et al.

(10) Patent No.: US 7,670,508 B2
(45) Date of Patent: Mar. 2, 2010

(54) PROTON CONDUCTOR, SINGLE ION CONDUCTOR, MANUFACTURING METHODS THEREOF, AND ELECTROCHEMICAL CAPACITOR

(75) Inventors: Tomitaro Hara, Kanagawa (JP); Ryosuke Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 10/533,604

(22) PCT Filed: Nov. 17, 2003

(86) PCT No.: PCT/JP03/14574
§ 371 (c)(1),
(2), (4) Date: Apr. 29, 2005

(87) PCT Pub. No.: WO2004/047122
PCT Pub. Date: Jun. 3, 2004

(65) Prior Publication Data
US 2006/0099474 A1    May 11, 2006

(30) Foreign Application Priority Data
Nov. 18, 2002   (JP) .............................. 2002-334245

(51) Int. Cl.
*H01B 1/00* (2006.01)
(52) U.S. Cl. .................. 252/500; 423/584; 429/30; 429/33; 429/231.8; 429/314; 521/27; 525/11; 525/242; 528/125
(58) Field of Classification Search .............. 252/500; 528/125; 429/33, 231.8, 30, 314; 428/447; 521/27; 423/584; 525/11, 242
See application file for complete search history.

(56) References Cited
U.S. PATENT DOCUMENTS
5,512,263 A * 4/1996 McIntyre .................... 423/584
(Continued)

FOREIGN PATENT DOCUMENTS
EP    1138712    10/2001
(Continued)

OTHER PUBLICATIONS
English Translation to JP 61-151241 A1 (Miyake et al.).*
(Continued)

*Primary Examiner*—Mark Kopec
*Assistant Examiner*—Khanh Tuan Nguyen
(74) *Attorney, Agent, or Firm*—K&L Gates LLP

(57) ABSTRACT

A proton conductor or a single ion conductor having high conductivity and a broad operation temperature range, manufacturing methods thereof and an electrochemical capacitor using it are provided. A compound having a structural part of Chemical formula 1 and a compound having a structure of Chemical formula 2 are included. X represents a protoic dissociation group, R1 represents a component including carbon, R2 and R3 represent a component including carbon or hydrogen, and n is in the range of n≧1. By action of the =NCOH group of the compound having the structure of Chemical formula 2, protons can be dissociated from the compound having the structural part of Chemical formula 1 and migrated. Therefore, water retention becomes unnecessary, and high proton conductivity can be obtained in a broad temperature range.

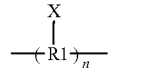

(Chemical formula 1)

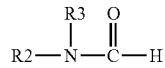

(Chemical formula 2)

4 Claims, 8 Drawing Sheets

U.S. PATENT DOCUMENTS

| | | | |
|---|---|---|---|
| 5,643,968 A * | 7/1997 | Andreola et al. | 521/27 |
| 5,705,534 A * | 1/1998 | D'Agostino et al. | 521/27 |
| 6,174,615 B1 * | 1/2001 | Ogata | 429/33 |
| 6,607,856 B2 * | 8/2003 | Suzuki et al. | 429/30 |
| 6,716,548 B1 * | 4/2004 | Kaliaguine et al. | 429/33 |
| 6,794,480 B2 * | 9/2004 | Goto et al. | 528/125 |
| 7,060,735 B2 * | 6/2006 | Taniguchi et al. | 521/27 |
| 7,153,608 B2 * | 12/2006 | Hinokuma et al. | 429/231.8 |
| 7,226,699 B2 * | 6/2007 | Uetake | 429/231.8 |
| 2001/0037000 A1 * | 11/2001 | Goto et al. | 525/242 |
| 2002/0160272 A1 * | 10/2002 | Tanaka et al. | 429/314 |
| 2002/0177656 A1 * | 11/2002 | Goto et al. | 525/11 |
| 2003/0087972 A1 * | 5/2003 | Taniguchi et al. | 521/27 |
| 2003/0148162 A1 * | 8/2003 | Narayanan et al. | 429/33 |
| 2004/0072045 A1 * | 4/2004 | Kuromatsu et al. | 429/33 |
| 2004/0115501 A1 * | 6/2004 | Hinokuma et al. | 429/33 |

FOREIGN PATENT DOCUMENTS

| | | |
|---|---|---|
| EP | 1245554 | 10/2002 |
| JP | 11-61-151241 A * | 7/1986 |
| JP | 61-151241 A1 * | 7/1986 |
| JP | 2000-082329 | 3/2000 |
| JP | 2001-155744 | 6/2001 |
| JP | 2001-167629 | 6/2001 |
| JP | 2001-192531 | 7/2001 |
| JP | 2001-236873 | 8/2001 |
| JP | 2001-294706 | 10/2001 |
| JP | 2001-329053 | 11/2001 |
| JP | 2002-293889 | 10/2002 |
| WO | WO 0163683 | 8/2001 |

OTHER PUBLICATIONS

A basic investigation of anhydrous proton conducting gel electrolytes written by W. Wieczorek, G. Zukowsak, R. Borkowska, S. H. Chung and S. Greenbaum published 2000.

* cited by examiner

PROTON CONDUCTOR, SINGLE ION CONDUCTOR, MANUFACTURING METHODS THEREOF, AND ELECTROCHEMICAL CAPACITOR

CROSS REFERENCE TO RELATED APPLICATION

The present application claims priority to Japanese Patent Document No. 2002-334245 filed on Nov. 18, 2002, the disclosure of which is herein incorporated by reference.

BACKGROUND OF THE INVENTION

The present invention relates to a proton conductor or a single ion conductor used for a device involving migration of cations or protons such as a secondary battery, a fuel battery, a hydrogen sensor, and an in vivo electrode, manufacturing methods thereof, and an electrochemical capacitor using it.

As one kind of solid electrolytes having an ion conductive mechanism, there is a single ion conductive high molecular weight film, which fixes a counter ionic species in a high molecular weight compound and migrates one ion species of cations or anions. As this single ion conductive high molecular weight film, for example, Nafion (registered trademark) developed by E.I. Du Pont in 1969 is known. Actual researches on mechanisms and the like have become activated in the 1980s. Synthesizing several ion conductors such as polyethylene glycol derivative, in which a carboxylic acid (carboxy group) or a sulfonic acid group (sulfo group) is bonded to a side chain, and a mechanism thereof have been considered. After that, as the technology related to fuel batteries has attracted attention again since environmental issues have come under close scrutiny, researches as an electrolyte film for solid electrolyte fuel batteries have become activated, and particularly in recent years, many researched have been performed.

Under such a background, currently, examination of a single ion conductor, particularly a proton conductor is still actively promoted. Wide applications of the proton conductor include not only the electrolyte film for solid electrolyte fuel batteries. Applications of the proton conductor have been expected in various fields such as barrier films for hydrogen sensor, biomimetic hydrogen migration films, materials for electrochromic display, proton conductor films for chemical reactor, and electrolyte films for proton migration type secondary battery. Many examinations including basic researches have been performed.

However, for the single ion conductor, there has been a problem that the ion conductivity is low. In the case of polyethylene glycol ion conductive macromolecule and the like, the ion conductivity is largely affected by temperature dependency of segment motion of the macromolecules, and therefore, the conductivity has not become superior to ion conductivity of liquid system. Further, with regard to the proton conductor, there has been a problem that the proton conductor is largely affected by moisture existing in the film (proton carrier), and therefore, the proton conductivity is significantly decreased due to decrease in the number of proton carrier in the range beyond 100° C., the boiling point of water, and its practically usable temperature range is limited to 100° C. or less.

Therefore, for example, an electrolyte film, which can have higher material strength and can express high proton conductivity by introducing an inorganic substance having an oxygen functional group into a proton conductive compound has been suggested (for example, refer to Japanese Unexamined Patent Application Publication No. 2001-155744). Further, a composite film, which can obtain high ion conductivity and can be used in a broad temperature range by mixing a high molecular weight compound having a lot of sulfonic acid groups and a cation transport type high molecular weight compound having low glass transition temperature has been suggested (for example, refer to Japanese Patent No. 2962360).

However, in the proton conductor described in Japanese Unexamined Patent Application Publication No. 2001-155744, though the film strength can be improved, the proton conductor still depends on moisture, moisture should be controlled in use, and therefore conventional problems cannot be resolved perfectly. Further, in the proton conductor described in Japanese Patent No. 2962360, since the high molecular weight compound is used as an ion carrier, the proton conductivity can be expressed even when moisture does not exist. However, there has been a problem that since the proton conductivity is subject to segment motion of macromolecules, and therefore, the conductivity when moisture does not exist is low, and further ingenuity is required for practical application.

With regard to cation transport functions in a nonaqueous solvent, there has been a report of a nonaqueous proton conductor using N,N-dimethyl formamide and phosphoric acid (for example, refer to W. Wieczorek et al., "Electrochimica Acta," England, Elsevier Science Ltd., 2001, Vol. 46, pp. 1427-1438). However, since this conductor includes phosphoric acid anions, this conductor is not a single ion conductor. Therefore, in the case of using this conductor for an electrical sensor, a battery or the like, there is a problem that it is necessary to consider chemical stability and polarization reaction of anion species. Further, this conductor is a liquid binary system, and therefore, this conductor cannot be used as a formed body unless a gelatinizer or the like is added. Therefore, in the case of trying development of various applications thereof, there is a problem that applicable usage is limited.

SUMMARY OF THE INVENTION

The present invention provides in an embodiment a proton conductor or a single ion conductor, which can be easily formed into a film or the like, has high conductivity and a broad operation temperature range, and particularly in a proton conductive compound, high proton conductivity can be obtained in a state that moisture does not exist; manufacturing methods thereof; and an electrochemical capacitor using it.

A proton conductor according to an embodiment includes a compound having a structural part expressed as Chemical formula 1 and a compound having a structure expressed as Chemical formula 2.

(Chemical formula 1)

where R1 represents a component including carbon (C), X represents a protoic dissociation, and n is in the range of n≧1.

(Chemical formula 2)

where R2 and R3 represent a component including carbon or hydrogen (H), respectively.

A single ion conductor according to an embodiment includes a compound having a structural part expressed as Chemical formula 3 and a compound having a structure expressed as Chemical formula 4.

(Chemical formula 3)

where R1 represents a component including carbon, Z represents a cationic dissociation group, and n is in the range of $n \geq 1$.

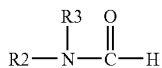
(Chemical formula 4)

where R2 and R3 represent a component including carbon or hydrogen (H), respectively.

A first method of manufacturing a proton conductor according to an embodiment includes impregnating a compound having a structural part expressed as Chemical formula 5 into a compound having a structure expressed as Chemical formula 6, or into a solution obtained by dissolving the compound having the structure expressed as Chemical formula 6 in a solvent.

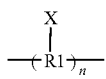
(Chemical formula 5)

where R1 represents a component including carbon, X represents a protic dissociation group and n is in the range of $n \geq 1$.

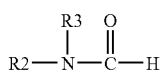
(Chemical formula 6)

where R2 and R3 represent a component including carbon or hydrogen, respectively.

A method of manufacturing a proton conductor according to another embodiment includes mixing a compound having a structural part expressed as Chemical formula 7 or Chemical formula 8 and a compound having a structure expressed as Chemical formula 9 in a solvent and evaporating the solvent.

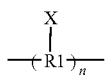
(Chemical formula 7)

where R1 represents a component including carbon, X represents a protic dissociation group and n is in the range of $n \geq 1$.

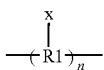
(Chemical formula 8)

where R1 represents a component including carbon, x represents a group capable of becoming a protic dissociation group by ion exchange, and n is in the range of $n \geq 1$.

(Chemical formula 9)

where R2 and R3 represent a component including carbon or hydrogen, respectively.

A method of manufacturing a single ion conductor according to includes impregnating a compound having a structural part expressed as Chemical formula 10 into a compound having a structure expressed as Chemical formula 11, or into a solution obtained by dissolving the compound having the structure expressed as Chemical formula 11 in a solvent.

(Chemical formula 10)

where R1 represents a component including carbon, Z represents a cationic dissociation group, and n is in the range of $n \geq 1$.

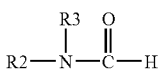
(Chemical formula 11)

where R2 and R3 represent a component including carbon or hydrogen, respectively.

A method of manufacturing a single ion conductor according to an embodiment includes mixing a compound having a structural part expressed as Chemical formula 12 or Chemical formula 13 and a compound having a structure expressed as Chemical formula 14 in a solvent and evaporating the solvent.

(Chemical formula 12)

where R1 represents a component including carbon, Z represents a cationic dissociation group, and n is in the range of $n \geq 1$.

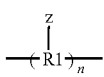
(Chemical formula 13)

where R1 represents a component including carbon, z represents a group capable of becoming a cationic dissociation group by ion exchange, and n is in the range of $n \geq 1$.

(Chemical formula 14)

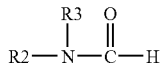

where R2 and R3 represent a component including carbon or hydrogen, respectively.

An electrochemical capacitor according to an embodiment has a capacitance between a pair of electrodes opposed with an electrolyte inbetween, wherein the electrolyte includes a compound having a structural part expressed as Chemical formula 15 and a compound having a structure expressed as Chemical formula 16.

(Chemical formula 15)

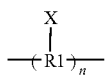

where R1 represents a component including carbon (C), X represents a protic dissociation group, and n is in the range of $n \geq 1$.

(Chemical formula 16)

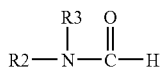

where R2 and R3 represent a component including carbon or hydrogen (H), respectively.

In the proton conductor and the single ion conductor according to an embodiment, the =NCOH group of the compound having the structure expressed as Chemical formula 2 or Chemical formula 4 interacts with protons or single ions existing in the compound having the structural part expressed as Chemical formula 1 or Chemical formula 3, and thereby protons or single ions are dissociated from the compound and ion conductivity or single ion conductivity can be obtained.

In a method of manufacturing a proton conductor according to an embodiment, the compound having the structural part expressed as Chemical formula 1 is impregnated into the compound having the structure expressed as Chemical formula 2 or into the solution obtained by dissolving the compound having the structure expressed as Chemical formula 2 in the solvent. Otherwise, the compound having the structural part expressed as Chemical formula 1 and the compound having the structure expressed as Chemical formula 2 are mixed in the solvent. Thereby, the proton conductor of the invention can be obtained.

In a method of manufacturing a single ion conductor according to an embodiment, the compound having the structural part expressed as Chemical formula 3 is impregnated into the compound having the structure expressed as Chemical formula 4 or into the solution obtained by dissolving the compound having the structure expressed as Chemical formula 4 in the solvent. Otherwise, the compound having the structural part expressed as Chemical formula 3 and the compound having the structure expressed as Chemical formula 4 are mixed in the solvent. Thereby, the single ion conductor according to an embodiment can be obtained.

In the electrochemical capacitor according to an embodiment, the proton conductor is used as the electrolyte. Therefore, high proton conductivity can be obtained in a state that moisture does not exist, and utilization in a broad range of voltage and a broad range of temperature is enabled.

Additional features and advantages of the present invention are described in, and will be apparent from, the following Detailed Description of the Invention and the figures.

DETAILED DESCRIPTION OF THE INVENTION

Figure 1:
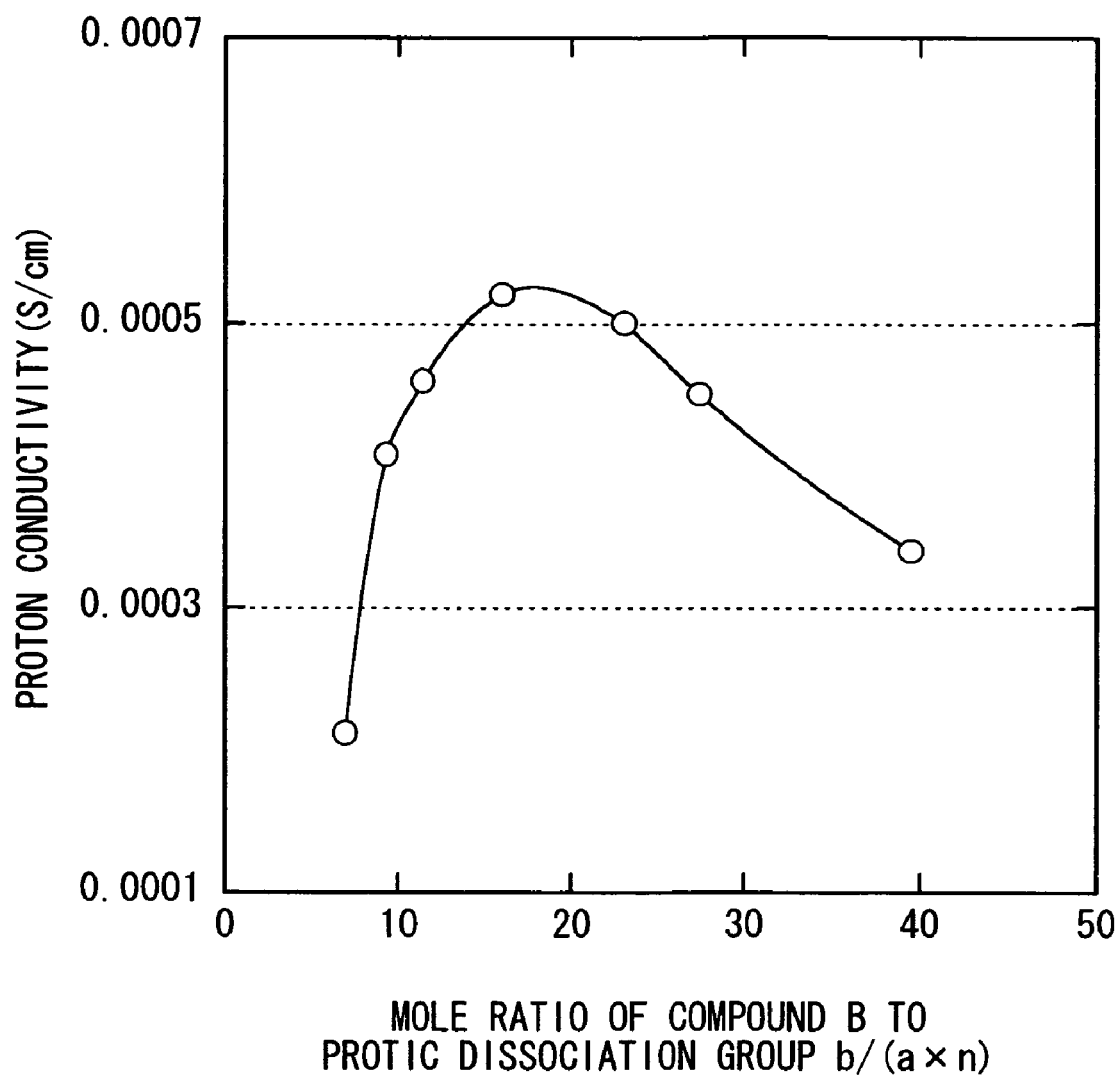
FIG. 1 is a characteristics view showing a relation between a mole ratio of a second compound B to a protic dissociation group X and proton conductivity in a proton conductor according to a first embodiment of the invention.

The present invention provides a proton conductor or a single ion conductor used for a device associated with migration of cations or protons, such as a secondary battery, a fuel battery, a hydrogen sensor, and an in vivo electrode, manufacturing methods thereof, and an electrochemical capacitor that utilizes same.

Embodiments of the invention will be hereinafter described in detail.

A proton conductor according to a first embodiment of the invention is a mixed complex including a compound A having a structural part expressed as Chemical formula 17, and a compound B having a structure expressed as Chemical formula 18.

(Chemical formula 17)

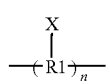

In the formula, R1 represents a component including carbon, and X represents a protic dissociation group. n is in the range of $n \geq 1$.

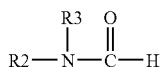
(Chemical formula 18)

In the formula, R2 and R3 represent a component including carbon or hydrogen, respectively.

The component R1 of the compound A has, for example, a main skeleton of carbon, and can include nitrogen (N), fluorine (F), sulfur (S), oxygen (O), hydrogen or the like. Of the foregoing, nitrogen, fluorine, sulfur, and oxygen can be included in a state that hydrogen bonding to carbon is substituted therewith, or in a state that carbon, which is the main skeleton is substituted therewith. A specific structure of the component R1 is, for example, a structure having a main skeleton of C—C bond, which can have C═C bond, C—N bond, C≡N bond, C—F bond, C—S bond, C—O bond, C═O bond, C—H bond, N═N bond, N—S bond, N═O bond, N—H bond, S—S bond, S—O bond, S═O bond, S—H bond, O—O bond, O—H bond or the like.

As the protic dissociation group X, for example, a —$SO_3H$ group (sulfonic acid group), a —COOH group (carboxylic acid group), or a —OH group (hydroxyl group) can be cited. The protic dissociation group X is not necessarily one kind, but two or more thereof can be included.

As a typical compound A having such a structure, a sulfonic acid type fluorocarbon resin, a carboxylic acid type fluorocarbon resin or the like can be cited. Specific brand names thereof include Nafion (registered trademark) of Du Pont, Aciplex (registered trademark) of Asahi Kagaku Kogyo Co., Ltd, and flemion (registered trademark) of Asahi Glass Co., Ltd.

As shown in Chemical formula 18, it is enough that the compound B has a ═NCOH group. Any of primary amine, secondary amine, and tertiary amine can be possible.

If the components R2 and R3 of the compound B includes a component including carbon, for example, the components R2 and R3 can have a main skeleton of carbon, and include hydrogen, halogen or the like. Of the foregoing, halogen is included in a state that hydrogen bonded to carbon is substituted. The substitution ratio is not particularly limited. A specific structure thereof is, for example, a structure having a main skeleton of C—C bond, which can have C═C bond, C—H bond, C—F bond, C—Cl bond, C—Br bond, C—I bond or the like. The composition R2 and the composition R3 can be identical or different with each other.

As such a compound B, N,N-dimethyl formamide, N,N-diethyl formamide, N,N-dibutyl formamide, diisopropyl formamide, N-methyl formamide, N-ethyl formamide, N-cyclohexyl formamide, N-benzil formamide, formamide and the like can be cited. Specially, N,N-dimethyl formamide or N-methyl formamide is preferable since good characteristics can be obtained. The compound B can be one kind, but two or more kinds thereof can be included by mixing. When two or more kinds thereof are included, respective compounds B having good affinity to each other are preferably used. The mixture ratio is optional.

It is thinkable that in this proton conductor, the ═NCOH group of the compound B interacts with protons existing in the compound A, and thereby protons are dissociated from the compound A, and proton conductivity is expressed. Therefore, a quantity ratio between the protic dissociation group X existing in the compound A and the compound B becomes a factor largely affecting proton conductivity.

For example, where a mole ratio between the compound A and the compound B is compound A:compound B=a:b, a ratio of the number of moles b of the compound B to the number of moles of the protic dissociation group X (=a×n) is preferably in the range of $10 \leqq b/(a \times n) \leqq 30$, and more preferably in the range of $15 \leqq b/(a \times n) \leqq 25$. If the ratio of the compound B is too small, protons are not migrated smoothly, and proton conductivity is decreased. Meanwhile, if the ratio of the compound B is too large, an amount of protons of the compound A is relatively decreased, the number of carrier comes short, and thereby proton conductivity is decreased.

FIG. 1 shows a relation between b/(a×n) and proton conductivity in a proton conductor obtained by mixing Nafion 117 (registered trademark), the compound A and N,N-dimethyl formamide, the compound B. As shown in FIG. 1, a tendency is shown that proton conductivity becomes large as the mole ratio of the compound B to the protic dissociation group X, b/(a×n) becomes large, shows the maximum value in the vicinity where b/(a×n) is 20, and then becomes small.

When the compound B is in a state of liquid singly, or in a state of liquid by being dissolved in a solvent, this proton conductor can be manufactured, for example, as follows.

Figure 2:
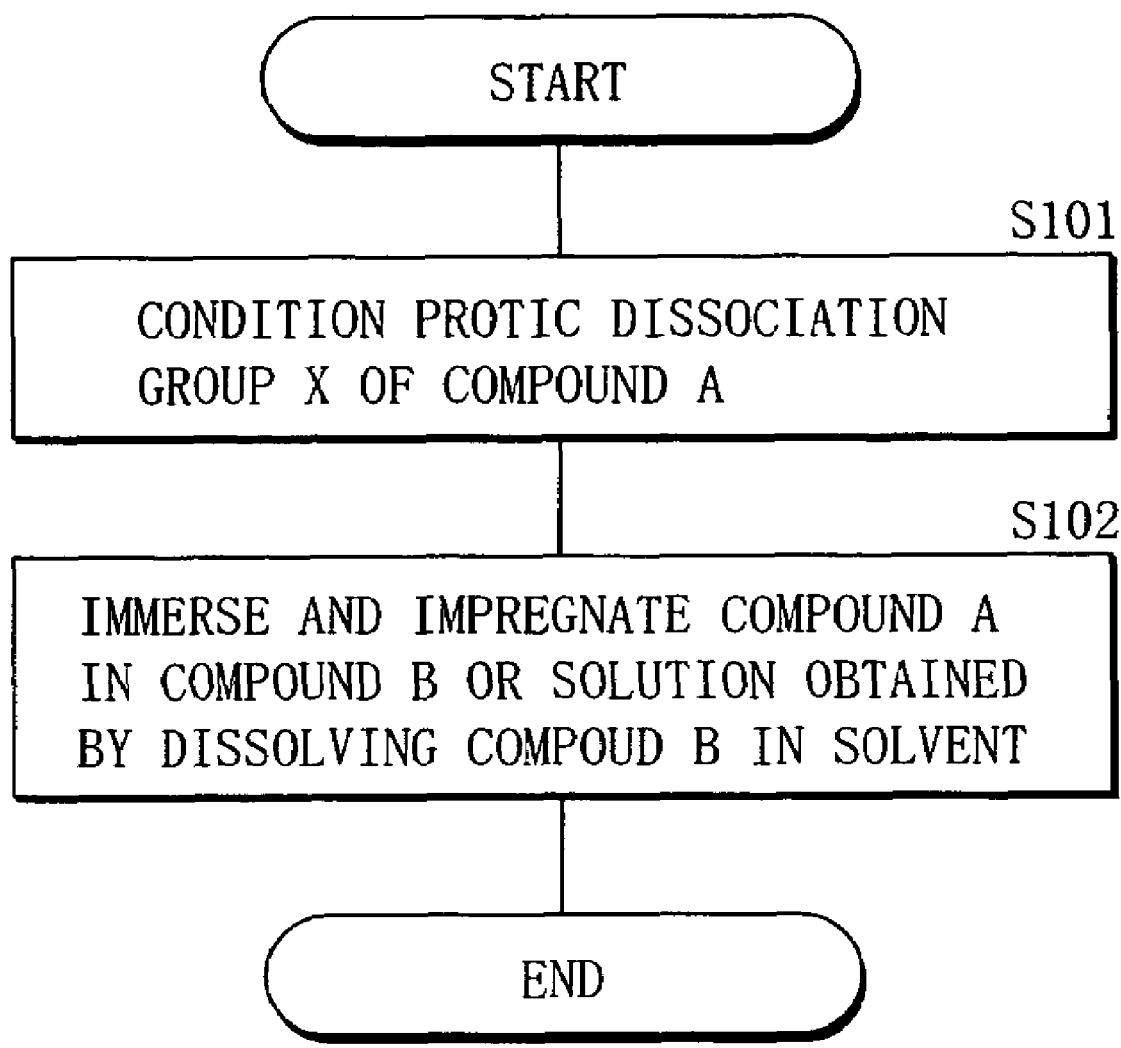
FIG. 2 is a flow chart showing a method of manufacturing the proton conductor according to the first embodiment of the invention.

FIG. 2 shows a method of manufacturing a proton conductor according to this embodiment. First, the protic dissociation group X of the compound A is conditioned by acid treatment and the like (Step S101). As acid treatment, for example, a method, in which the compound A is immersed into 5% halogen peroxide solution or 0.5 mol/l sulfuric acid water solution, and stirred while being heated up is generally used. After being provided with acid treatment, the compound A is sufficiently rinsed in pure water so that no residual from acid treatment remains.

Next, the compound A is immersed into the compound B or a solution obtained by dissolving the compound B in a solvent, and the compound A is impregnated into the compound B (Step S102). Since the protic dissociation group X of the compound A and the ═NCOH group of the compound B interact with each other, the compound B is uniformly introduced into the compound A. Then, if necessary, reduced-pressure treatment, heating treatment or the like can be performed. Thereby, the proton conductor according to this embodiment can be obtained.

Further, when the compound B is solid or can be dissolved in a solvent only in a diluted state, for example, the proton conductor can be manufactured as follows.

Figure 3:
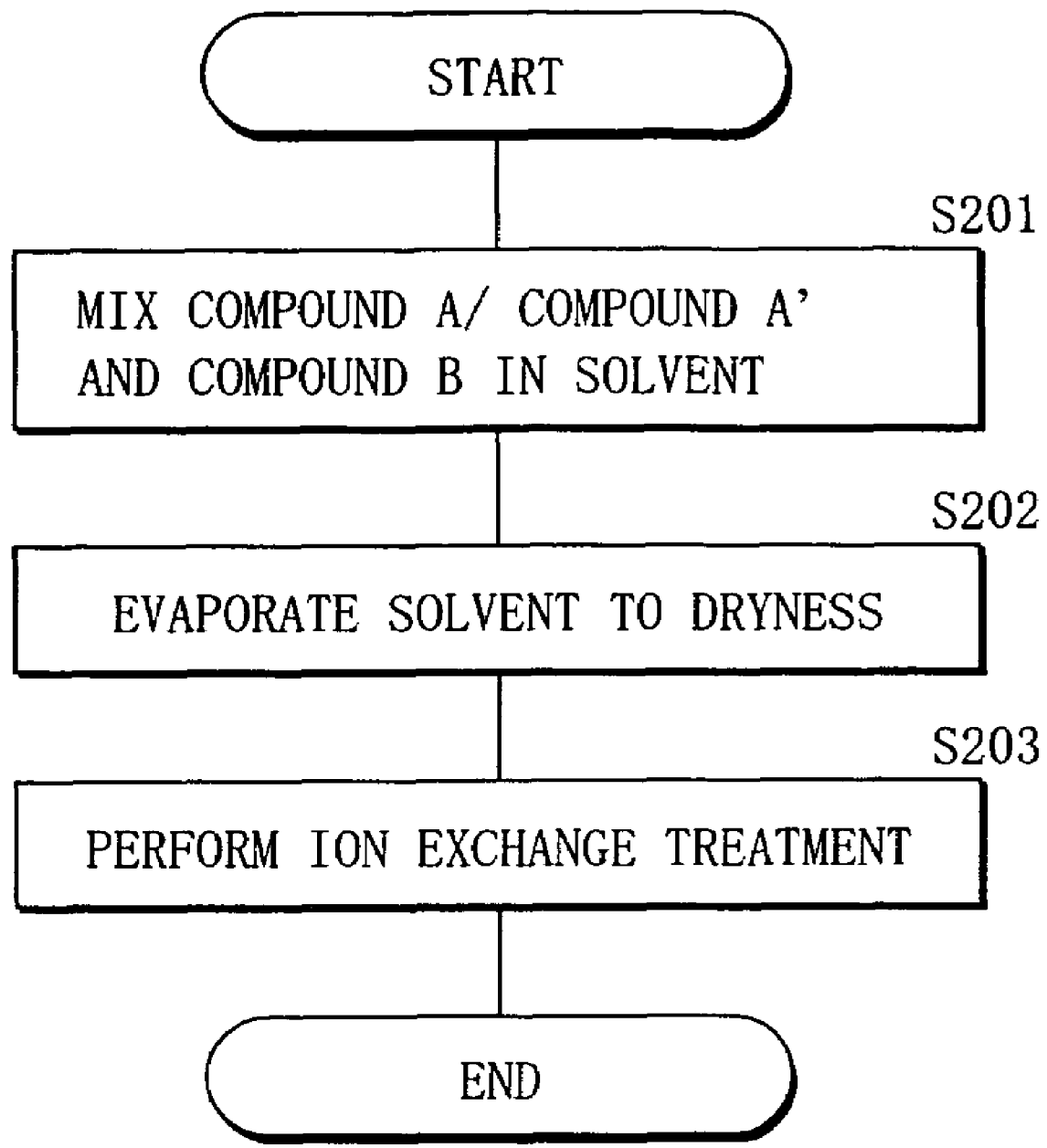
FIG. 3 is a flow chart showing another method of manufacturing the proton conductor according to the first embodiment of the invention.

FIG. 3 shows another method of manufacturing a proton conductor according to this embodiment. First, for example, the compound A and the compound B are mixed in a solvent, and dispersed in the same solvent. Further, it is possible that instead of the compound A, a compound A', which is a precursor of the compound A and can become the compound A by ion exchange can be used (Step S201). The compound A' has a structural part expressed as Chemical formula 19.

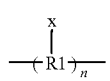
(Chemical formula 19)

In the formula, R1 represents a component including carbon, and x represents a group capable of becoming a protic dissociation group by ion exchange. n is in the range of $n \geqq 1$.

Next, the solvent is evaporated to dryness (Step S202). Subsequently, for example, ion exchange is performed by applying direct current electricity in, for example, the hydrogen atmosphere, the protic dissociation group X is conditioned to make the compound A' into the compound A (Step S203). This ion exchange treatment is not limited to the case using the compound A', but can be performed in the case using the compound A. Thereby, the proton conductor according to this embodiment can be obtained. Also with this manufacturing method, by conditioning affinity between the dispersing solvent and the compound A, the compound B; or affinity between the dispersing solvent and the compound A', the compound B, the protic dissociation group X of the compound A or the group x capable of becoming the protic dissociation group of the compound A' and the =NCOH group of the compound B interact with each other, and thereby a uniform complex can be obtained. This manufacturing method can be also applied to the case, in which the compound B is in a state of liquid singly or in a state of liquid by being dissolved in a solvent.

This proton conductor operates as follows.

In this proton conductor, when an electrical field is applied, the =NCOH group included in the compound B interacts with protons included in the compound A. Then, protons are dissociated from the compound A and migrated. Therefore, even when water as a proton carrier does not exist, high conductivity can be obtained, and superior characteristics can be obtained in a broad temperature range.

As described above, according to the proton conductor of this embodiment, the compound A having the structural part expressed as Chemical formula 17 and the compound B having a structure expressed as Chemical formula 18 are included. Therefore, protons can be dissociated from the compound A and migrated by action of the =NCOH group of the compound B. Therefore, water retention becomes unnecessary, high proton conductivity can be obtained in a broad temperature range, and only protons can be migrated. In addition, the proton conductor can be easily formed into a film.

In particular, when the mole ratio of the compound B to the protic dissociation group X, b/(a×n) is in the range of $10 \leq b/(a \times n) \leq 30$, further $15 \leq b/(a \times n) \leq 25$, proton conductivity can be more improved.

Further, according to the methods of manufacturing a proton conductor according to this embodiment, the compound A is impregnated in the compound B or the solution obtained by dissolving the compound B in the solvent; or the compound A or the compound A' and the compound B are mixed in the solvent and the solvent is evaporated. Therefore, the proton conductor according to this embodiment can be simply and uniformly manufactured.

The proton conductor according to this embodiment can be, for example, preferably used for an electrochemical capacitor as described below.

Figure 4:
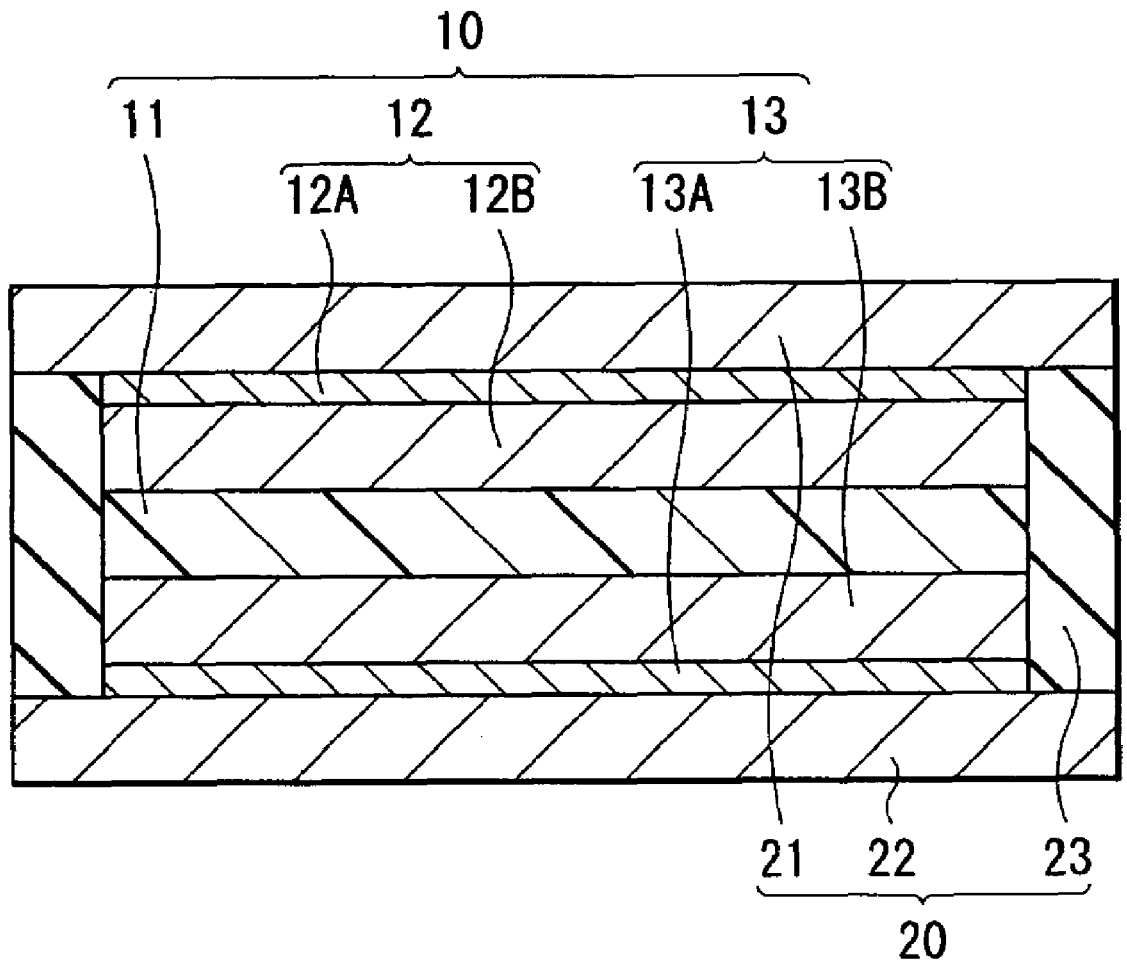
FIG. 4 is a cross section showing a construction of an electrochemical capacitor using the proton conductor according to the first embodiment of the invention.

FIG. 4 shows a construction of the electrochemical capacitor according to one embodiment of the invention. This electrochemical capacitor has an electrochemical device 10, in which a pair of electrodes 12 and 13 are opposed with an electrolyte 11 made of the proton conductor according to this embodiment inbetween. Between the electrode 12 and the electrode 13, the electrochemical device 10 has a capacitance C expressed as Mathematical formula 1 and a pseudo capacity K expressed as a derived function expressed as Mathematical formula 2, equivalent to a capacity generated from a thermodynamic relationship.

$$Q=(\tfrac{1}{2})CV^2 \quad \text{(Mathematical formula 1)}$$

In the formula, Q is an electrical charge, C is the capacitance, and V is an applied voltage.

$$K=d(\Delta q)/d(\Delta v) \quad \text{(Mathematical formula 2)}$$

In the formula, K is the pseudo capacity, $\Delta q$ is magnitude of electrical charge, and $\Delta v$ is magnitude of electrical change.

The pseudo capacity K shown in Mathematical formula 2 is expressed when a given parameter y proportional to a current carrying electrical charge is related to a potential by Mathematical formula 3.

$$y/(1-y)=K_{exp}(VF/RT) \quad \text{(Mathematical formula 3)}$$

In the formula, K is the pseudo capacity, V is an electrode potential, F is the Faraday constant, R is the gas constant, and T is a temperature.

The electrode 12 has a structure, in which, for example, an electrode layer 12B is provided on a current collector 12A. Similarly, the electrode 13 has a structure, in which, for example, an electrode layer 13B is provided on a current collector 13A. The current collector 12A and 13A include a conductive material, and preferably has electronic conductivity of $1 \times 10^2$ S/cm or more. As a conductive material constructing the current collectors 12A and 13A, for example, a metal material such as gold (Au), silver (Ag), copper (Cu), iron (Fe), aluminum (Al), nickel (Ni), platinum (Pt), and manganese (Mn), or an organic material such as carbon and polyacetylene can be cited. The current collectors 12A and 13A can be constructed from a single material, or constructed from a plurality of materials. Any composition can be used as long as the electronic conductivity falls within the foregoing range. As a substance obtained by mixing the conductive materials, for example, a conductive rubber material can be cited.

The electrode layers 12B and 13B include an electrode material capable of having the capacitance C and the foregoing pseudo capacity K between the electrode 12 and the electrode 13. As such an electrode material, for example, an oxide such as ruthenium oxide ($RuO_2$), indium oxide ($IrO_2$), and cobalt oxide ($CO_3O_4$), or a high molecular weight material such as polyaniline, polyindole, and polyquinone can be cited. One kind of the electrode material can be used singly, or two or more thereof can be used by mixing. If necessary, the electrode layers 12B and 13B can include a conductive agent, a binder or the like in addition to the electrode material.

Further, though not shown, the electrochemical device 10 can comprise a separator between the electrodes 12 and 13, and the electrolyte 11 can be impregnated in the separator. Any separator can be used as long as the separator has high electronic insulative characteristics and superior ion permeability, and is electrochemically stable. As a separator, for example, a glass fiber compounded paper, or a substance constructed from a porous plastic thin film such as a porous polypropylene thin film can be cited.

The electrochemical device 10 is, for example, housed inside an exterior member 20. The exterior member has a conductive member 21 provided to be contacted with the current collector 12A and a conductive member 22 provided to be contacted with the current collector 13A. An insulating member 23 is arranged between the conductive members 21 and 22.

This electrochemical capacitor can be manufactured by, for example, forming the electrodes 12 and 13, then using the proton conductor fabricated as described above as the electrolyte 11, layering the electrodes 12 and 13 with the electrolyte 11 inbetween, and enclosing the resultant inside the exterior member 20.

Further, it is possible to fabricate the electrolyte 11 on the electrodes 12 and 13, which are layered. Further, it is possible to impregnate the electrolyte 11 into an unshown separator, which is layered with the electrodes 12 and 13.

In the electrochemical capacitor, when a voltage is applied between the electrodes 12 and 13, the capacitance C and the foregoing pseudo capacity K are stored between the electrodes 12 and 13. In this embodiment, since the foregoing proton conductor is used as the electrolyte 11, the electrochemical capacitor operates even when water does not exist. Therefore, the electrochemical capacitor can be operated even in the high temperature range or with a high voltage.

As described above, according to the electrochemical capacitor of this embodiment, the proton conductor according to this embodiment is used as the electrolyte 11. Therefore, the electrochemical capacitor can be used even in the high temperature range. Further, when the electrochemical capacitor is manufactured, high temperature treatment can be performed, for example, when the layered body is enclosed in the exterior member 20. Therefore, manufacturing thereof can be facilitated. Further, a high voltage can be applied, and an energy density can be improved.

A single ion conductor according to a second embodiment of the invention is a mixed complex including a compound C having a structural part expressed as Chemical formula 20 and the foregoing compound B. The compound C has the same construction as of the compound A in the first embodiment, except that the compound C has a cationic dissociation group Z instead of the protic dissociation group X.

(Chemical formula 20)

In the formula, R1 represents a composition including carbon, and z represents the cationic dissociation group. n is in the range of $n \geq 1$.

As the cationic dissociation group Z, for example, a —$SO_3M$ group, a —COOM group, a —OM group or the like can be cited. However, M represents lithium (Li), sodium (Na), potassium (K), or rubidium (Rb). The cationic dissociation group Z is not necessarily one kind, but two or more thereof can be included.

The compound B is the same as in the first embodiment. It is thinkable that in this embodiment, the =NCOH group of the compound B interacts with cations existing in the compound C, and thereby cations are dissociated, and ion conductivity is expressed. Therefore, a quantity ratio between the cationic dissociation group Z existing in the compound C and the compound B preferably has a relation similar to in the first embodiment. For example, where a mole ratio between the compound C and the compound B is compound C:compound B=c:b, a ratio of the number of moles b of the compound B to the number of moles of the cationic dissociation group Z (=c×n) is preferably in the range of $10 \leq b/(c \times n) \leq 30$, and more preferably in the range of $15 \leq b/(c \times n) \leq 25$.

This single ion conductor can be manufactured as in the first embodiment (refer to FIGS. 2 and 3). However, in the case of manufacturing the single ion conductor by the method shown in FIG. 2, after acid treatment (refer to Step S101) is performed, for example, cation exchange treatment is performed by immersing the compound C in hydroxide water solution including target cations such as lithium hydroxide water solution and sodium hydroxide water solution to condition the cationic dissociation group Z. Next, once drying treatment is performed and the solvent used in cation exchange is removed. After that, the compound C is impregnated in the compound B (refer to Step S102).

Further, in the case of manufacturing the single ion conductor by the method shown in FIG. 3, the compound C or a compound C', which is a precursor of the compound C and has a structural part expressed as Chemical formula 21, and the compound B are mixed in a solvent (refer to Step S201). Ion exchange (refer to Step S203) is performed by, for example, applying direct current electricity while a lithium metal or the like is used as a counter electrode, and thereby the target cationic dissociation group Z is prepared.

(Chemical formula 21)

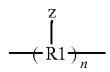

In the formula, R1 represents a component including carbon, and z represents a group capable of becoming a cationic dissociation group by ion exchange. n is in the range of $n \geq 1$.

As described above, according to the single ion conductor of this embodiment, the compound C having the structural part expressed as Chemical formula 20 and the compound B having the structure expressed as Chemical formula 18 are included. Therefore, cations can be dissociated from the compound C and migrated by action of the =NCOH group of the compound B. Therefore, only cations can be migrated, and high ion conductivity can be obtained in a broad temperature range. In addition, the single ion conductor can be easily formed into a film.

Further, specific examples of the invention will be hereinafter described in detail.

EXAMPLE 1-1

First, as the compound A, a perfluoro sulfonic acid high molecular weight ion exchange film, in which a molecular weight per 1 mol of the protic dissociation group X (acid equivalent weight) was 1200 g/mol was prepared. Acid treatment was performed by using 10% halogen peroxide solution and 0.5 mol/l sulfuric acid water solution, and the protic dissociation group X was made into a sulfonic acid group. Next, this perfluoro sulfonic acid high molecular weight ion exchange film was dried for 24 hours at 120° C. and under 1333 Pa. After that, the resultant was immersed and impregnated in N,N-dimethyl formamide (DMF) as the compound B for 100 hours at room temperatures. Thereby, the proton conductor having the composition shown in Table 1 was obtained. An introduction amount of the compound B was calculated by the formula expressed in Mathematical formula 4 after measuring film masses before and after impregnation treatment into the compound B.

Introduction amount of compound B=(mass after impregnation−mass before impregnation)/(mass after impregnation)  (Mathematical formula 4)

The obtained proton conductor was cut so that the area became 2 cm², and proton conductivity at from 70° C. to −20° C. was calculated by AC impedance measurement. The obtained result is shown in Table 1 and FIG. 5. As shown in Table 1 and FIG. 5, proton conductivity at 70° C., 30° C., and −20° C. was very high, which was $9.0 \times 10^{-4}$ S/cm, $5.0 \times 10^{-4}$ S/cm, and $2.0 \times 10^{-4}$ S/cm, respectively.

EXAMPLE 1-2

First, as the compound A, a perfluoro carboxylic acid high molecular weight ion exchange film, in which a molecular weight per 1 mol of the protic dissociation group X (acid equivalent weight) was 1200 g/mol was prepared. Acid treatment was performed as in Example 1-1, and the protic dissociation group X was made into a carboxylic acid group. Next, this perfluoro carboxylic acid high molecular weight ion exchange film was dried under the conditions similar to of Example 1-1. Subsequently, as the compound B, a compound obtained by mixing N,N-dimethyl formamide (DMF) and N-methyl formamide (MF) at a volume ratio of 1:1 was prepared. The perfluoro carboxylic acid high molecular weight ion exchange film was immersed and impregnated in this mixture for 100 hours at room temperatures. Thereby, the proton conductor having the composition shown in Table 1 was obtained. For the proton conductor of Example 1-2, proton conductivity was also calculated as in Example 1-1. The obtained result is shown in Table 1 and FIG. 5.

Figure 5:
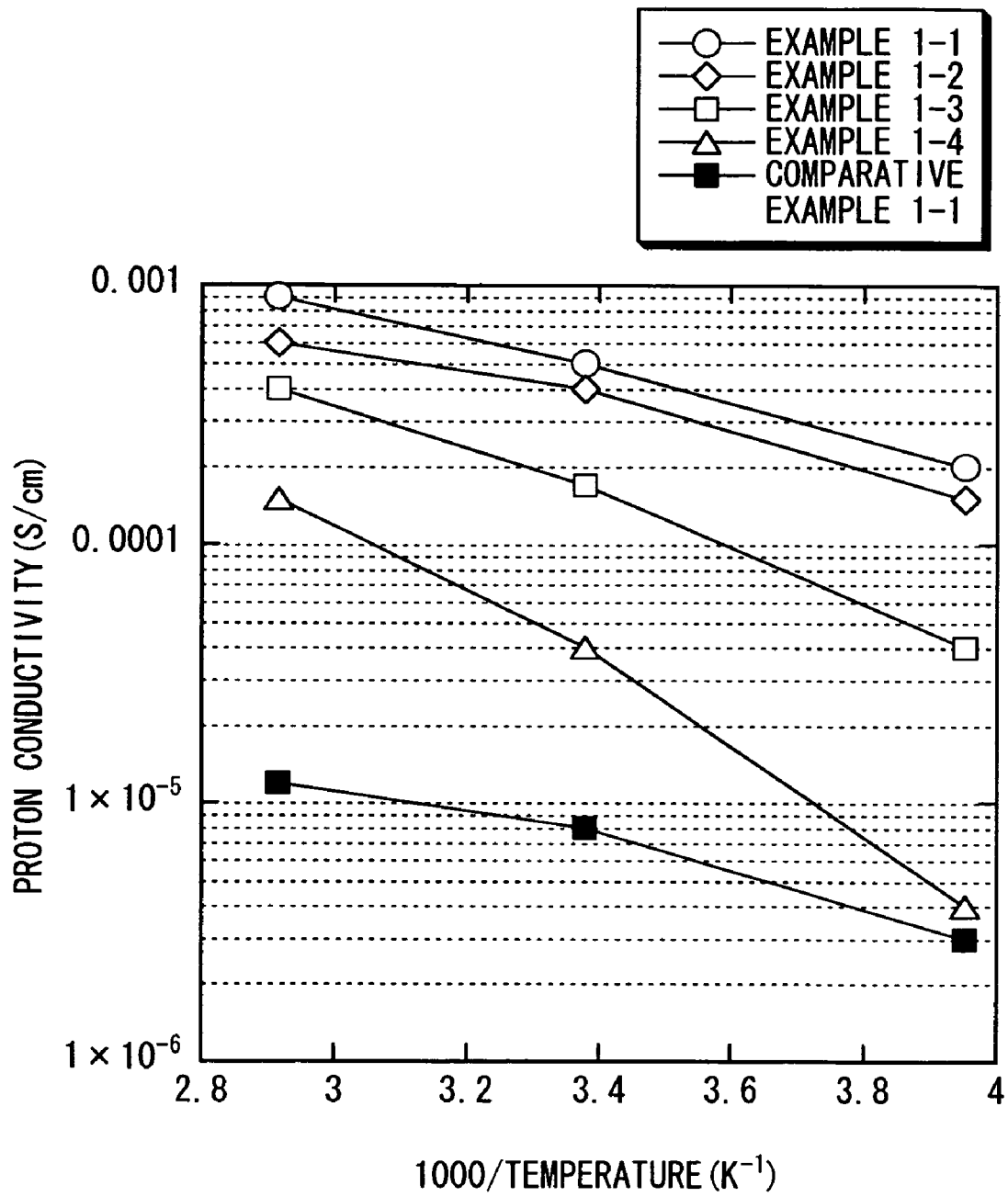
FIG. 5 is a characteristics view showing a relation between temperatures and proton conductivity in proton conductors according to Examples 1-1 to 1-4 of the invention.

As shown in Table 1 and FIG. 5, proton conductivity at 70° C., 30° C., and −20° C. was very high as in Example 1-1, which was $6.0 \times 10^{-4}$ S/cm, $4.0 \times 10^{-4}$ S/cm, and $1.5 \times 10^{-4}$ S/cm, respectively.

EXAMPLE 1-3

First, a perfluoro sulfonic acid high molecular weight ion exchange resin, in which a molecular weight per 1 mol of a group x capable of becoming a protic dissociation group by ion exchange was 1200 g/mol as the compound A' was dissolved in a solvent obtained by mixing methanol, ethanol, and propanol at a concentration of 5 wt % to prepare a mixed solution. Next, 6 g of N-benzil formamide (BF) as the compound B was added to and mixed with 100 g of this mixed solution. After that, the resultant was dried for 48 hours at 60° C. under 13332 Pa to obtain a white translucent film including the compound A' and the compound B. Subsequently, the obtained film was sandwiched by a carbon sheet, hydrogen substitution was performed by applying 1 mA/cm$^2$ direct current electricity for 12 hours in the hydrogen atmosphere, and the protic dissociation group X was made into a sulfonic acid group. Thereby, the proton conductor having the composition shown in Table 1 was obtained. For the proton conductor of Example 1-3, proton conductivity was calculated as in Example 1-1. The obtained result is shown in Table 1 and FIG. 5.

As shown in Table 1 and FIG. 5, proton conductivity at 70° C., 30° C., and −20° C. was very high as in Example 1-1, which was $4.0 \times 10^{-4}$ S/cm, $1.7 \times 10^{-4}$ S/cm, and $4.0 \times 10^{-5}$ S/cm, respectively.

EXAMPLE 1-4

First, a perfluoro carboxylic acid high molecular weight ion exchange film, in which a molecular weight per 1 mol of the protic dissociation group X (acid equivalent weight) was 1200 g/mol was prepared as the compound A, acid treatment was performed as in Example 1-1, and the protic dissociation group X was made into a carboxylic acid group. Next, this perfluoro carboxylic acid high molecular weight ion exchange film was dried under conditions similar to of Example 1-1, and then immersed and impregnated for 100 hours in a substance as the compound B, in which N-methyl formamide (MF) was refluxed at the boiling point. Thereby, the proton conductor having the composition shown in Table 1 was obtained. For the proton conductor of Example 1-4, proton conductivity was calculated as in Example 1-1. The obtained result is shown in Table 1 and FIG. 5.

As shown in Table 1 and FIG. 5, proton conductivity at 70° C., 30° C., and −20° C. was lower than of Example 1-1, but was very high, which was $1.5 \times 10^{-4}$ S/cm, $4.0 \times 10^{-5}$ S/cm, and $4.0 \times 10^{-6}$ S/cm, respectively.

COMPARATIVE EXAMPLE 1-1

First, a perfluoro carboxylic acid high molecular weight ion exchange film, in which a molecular weight per 1 mol of the protic dissociation group X (acid equivalent weight) was 1200 g/mol was prepared as the compound A, acid treatment was performed as in Example 1-1, and the protic dissociation group X was made into a carboxylic acid group. Next, this perfluoro carboxylic acid high molecular weight ion exchange film was dried under conditions similar to of Example 1-1. Subsequently, instead of the compound B, butyl formate: H—C(=O)—O—C$_3$H$_7$ having the boiling point of 107° C. including no =NCOH group was prepared. The perfluoro carboxylic acid high molecular weight ion exchange film was immersed and impregnated in this butyl formate at room temperatures for 100 hours. Thereby, the proton conductor having the composition shown in Table 1 was obtained. For the proton conductor of Comparative example 1-1, proton conductivity was calculated as in Example 1-1. The obtained result is shown in Table 1 and FIG. 5.

As shown in Table 1 and FIG. 5, proton conductivity at 70° C., 30° C., and −20° C. was lower than of Examples 1-1 to 1-4, which was $1.2 \times 10^{-5}$ S/cm, $8.0 \times 10^{-6}$ S/cm, and $3.0 \times 10^{-6}$ S/cm, respectively.

CONCLUSION OF EXAMPLES 1-1 TO 1-4

That is, it was found that when the compound B having the =NCOH group was included, superior proton conductivity could be obtained. Further, it was found that the protic dissociation group X could be the —SO$_3$H group or the —COOH group. Further, it was found that with regard to manufacturing methods, superior proton conductivity could be obtained by using either of two types described in the foregoing embodiment. Further, it was confirmed that proton conductivity of Example 1-1, in which the mole ratio of the compound B to the protic dissociation group X, b/(a×n) was adjusted to about 20 was the highest, and the mole ratio of the compound B to the protic dissociation group X was preferably in the range of $10 \leq b/(a \times n) \leq 30$, and more preferably in the range of $15 \leq b/(a \times n) \leq 25$.

EXAMPLE 2-1

First, the same perfluoro sulfonic acid high molecular weight ion exchange film as of Example 1-1 was prepared as the compound C, acid treatment was performed as in Example 1-1, and the resultant was impregnated in 2 mol/l lithium hydroxide water solution for 24 hours or more to perform ion exchange treatment to make the cationic dissociation group Z into a —SO$_3$Li group. This film after ion exchange was immersed in sodium hydrate water solution, and neutralization titration by hydrochloric acid was performed. Then, when a remaining proton amount was calculated, an ion exchange ratio was 90% or more. Next, the film after ion exchange was dried under the conditions similar to Example 1-1, and then immersed and impregnated in N,N-dimethyl formamide (DMF) as the compound B as in Example 1-1. Thereby, the single ion conductor having the composition shown in Table 2 was obtained. For the obtained single ion conductor, ion conductivity was calculated as in Example 1-1. The obtained result is shown in Table 2 and FIG. 6.

Figure 6:
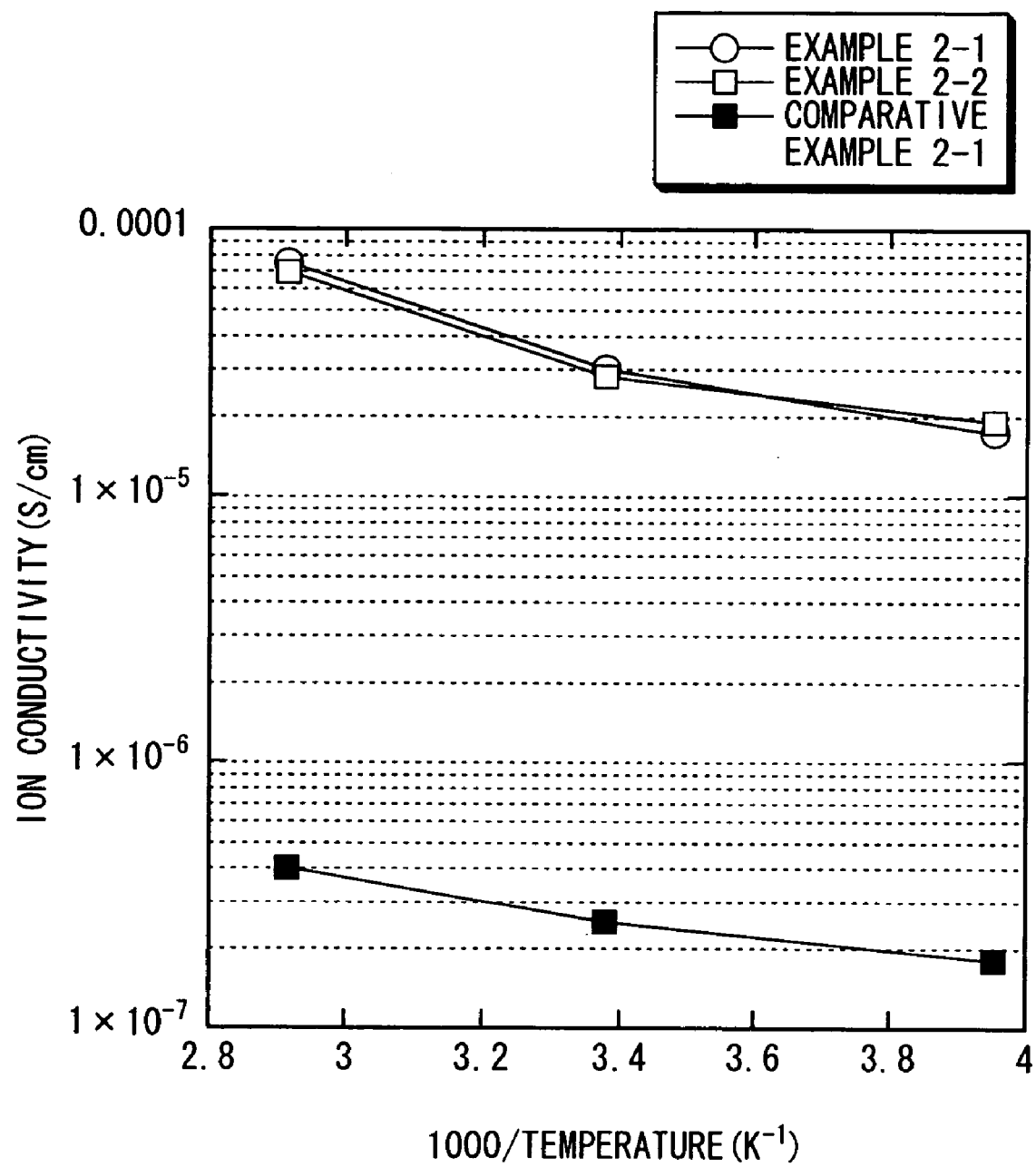
FIG. 6 is a characteristics view showing a relation between temperatures and ion conductivity in single ion conductors according to Examples 2-1 and 2-2 of the invention.

As shown in Table 2 and FIG. 6, ion conductivity at 70° C., 30° C., and −20° C. was very high, which was $7.5 \times 10^{-5}$ S/cm, $3.0 \times 10^{-5}$ S/cm, and $1.7 \times 10^{-5}$ S/cm, respectively.

EXAMPLE 2-2

A single ion conductor was fabricated as in Example 2-1, except that N-methyl formamide (MF) was used as the compound B. Ion conductivity thereof was calculated. The obtained result is shown in Table 2 and FIG. 6. As shown in Table 2 and FIG. 6, ion conductivity at 70° C., 30° C., and −20° C. was very high as in Example 2-1, which was $6.9 \times 10^{-5}$ S/cm, $2.8 \times 10^{-5}$ S/cm, and $1.9 \times 10^{-5}$ S/cm, respectively.

COMPARATIVE EXAMPLE 2-1

A single ion conductor was fabricated as in Example 2-1, except that butyl formate including no =NCOH group was used instead of the compound B. Ion conductivity thereof was calculated. The obtained result is shown in Table 2 and FIG. 6. As shown in Table 2 and FIG. 6, ion conductivity at 70° C., 30° C., and −20° C. was low compared to of Examples 2-1 and 2-2, which was $4.0 \times 10^{-7}$ S/cm, $2.5 \times 10^{-7}$ S/cm, and $1.8 \times 10^{-7}$ S/cm, respectively.

CONCLUSION OF EXAMPLES 2-1 AND 2-2

That is, it was found that the compound B having the =NCOH group was included, superior ion conductivity could be also obtained with regard to the single ion conductor.

EXAMPLE 3-1

The electrochemical capacitor as shown in FIG. 4 was fabricated. With regard to a method of fabricating the electrochemical capacitor, Japanese version (published by NTS Co., Ltd. in 2001) of "Electrochemical Supercapacitors," B. E. Conway, published by Kluwer Academic/Plenum Publishers in 1999) was consulted.

First, 8 g of polyaniline as the electrode material and 2 g of acetylene black as the conductive aid were suspended and dispersed in 5 cm$^3$ of alcohol solution, in which perfluoro sulfonic acid high molecular weight compound was dissolved by 20% to prepare a coating agent. Next, a carbon sheet was prepared as the current collectors 12A and 13A, and the current collectors 12A and 13A were coated with the prepared coating agent, vacuum drying treatment was performed at 100° C. to form the electrode layers 12B and 13B. Thereby, the electrodes 12 and 13 were obtained.

Further, a perfluoro sulfonic acid high molecular weight ion exchange film was prepared as the compound A, acid treatment was performed by using 1 mol/l sulfuric acid water solution, and the protic dissociation group X was made into a sulfonic acid group. After that, the resultant was vacuum-dried at 100° C. Next, this perfluoro sulfonic acid high molecular weight ion exchange film was immersed and impregnated in N,N-dimethyl formamide solution as the compound B for 24 hours to prepare a proton conductor.

Subsequently, the fabricated proton conductor as the electrolyte 11 was sandwiched between the electrodes 12 and 13, the resultant was layered, hot-pressed for 1 to 2 minutes at 110° C. After that, the resultant was further immersed in N,N-dimethyl formamide solution to fabricate the electrochemical device 10. After that, the electrochemical device 10 was housed inside the exterior member 20 to obtain the electrochemical capacitor.

As a comparative example to Example 3-1, an electrochemical capacitor was fabricated as in Example 3-1, except that N,N-dimethyl formamide was not used as an electrolyte. Specifically, a perfluoro sulfonic acid high molecular weight ion exchange film was provided with acid treatment by using 1 mol/l sulfuric acid water solution, and was sandwiched between the electrodes 12 and 13 fabricated as in Example 3-1, and the resultant was hot-pressed for 1 to 2 minutes at 110° C. The resultant was further hot-pressed while being immersed in 1 mol/l sulfuric acid water solution. After that, the resultant was housed inside the exterior member. In Table 3, constructions of Example 3-1 and Comparative example 3-1 are shown by comparison.

Figure 7:
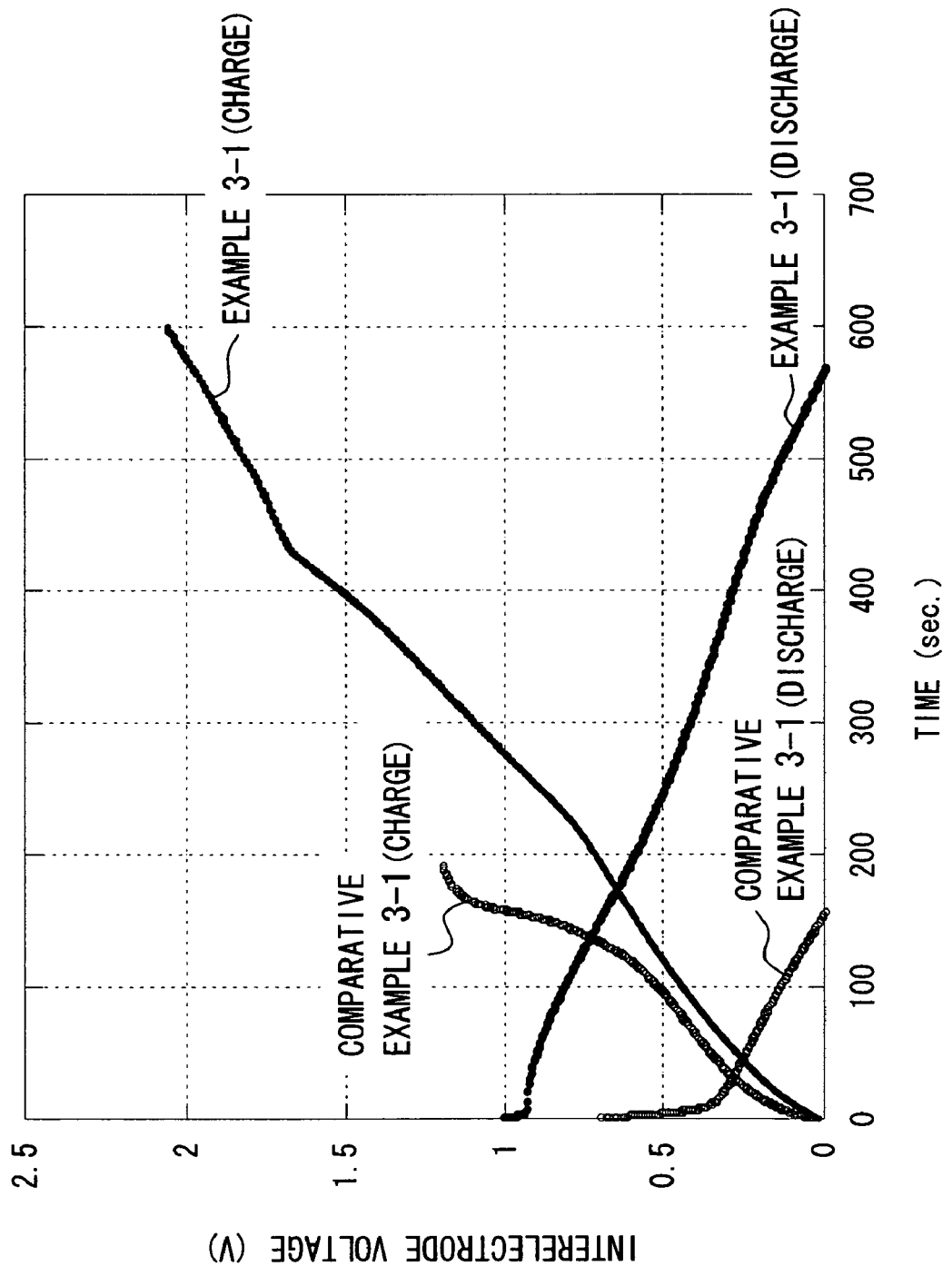
FIG. 7 is a characteristics view showing charge and discharge curves in an electrochemical capacitor according to Example 3-1 of the invention.

With regard to the fabricated electrochemical capacitors of Example 3-1 and Comparative example 3-1, 1 mA constant current charge and discharge was performed. The results are shown in FIG. 7. As shown in FIG. 7, it was confirmed that according to Example 3-1, a high voltage could be applied and a high energy density could be obtained compared to in Comparative example 3-1 including no compound B. That is, it was found that when the electrolyte 11 including the compound B having the =NCOH group was used, the energy density could be improved.

EXAMPLE 3-2

The electrochemical capacitor as shown in FIG. 4 was fabricated as in Example 3-1. Then, the electrodes 12 and 13 were fabricated as in Example 3-1, except that ruthenium oxide was used as an electrode material instead of polyaniline. Further, as the electrolyte 11, differently from in Example 3-1, a proton conductor obtained by dissolving 2 mol/l trifluoro metane sulfonic acid in N, N-dimethyl formamide was used. The electrodes 12 and 13 were layered with a separator made of a 100 μm polypropylene nonwoven fabric inbetween, in which the electrolyte 11 was impregnated.

As Comparative example 3-2 to Example 3-2, an electrochemical capacitor was fabricated as in Example 3-2, except that 1 mol/l sulfuric acid water solution was used as an electrolyte. In Table 4, constructions of Example 3-2 and Comparative example 3-2 are shown by comparison.

Figure 8:
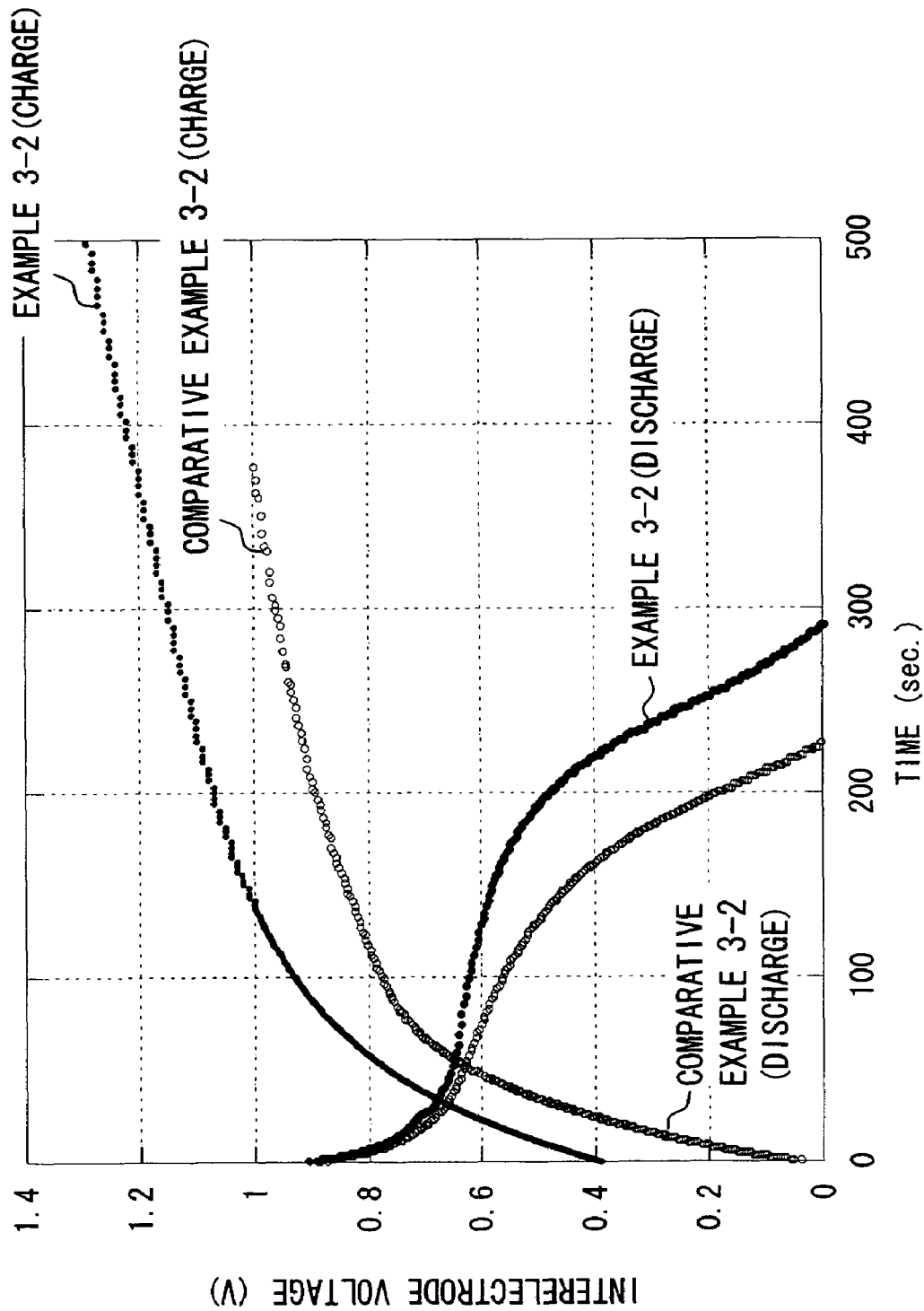
FIG. 8 is a characteristics view showing charge and discharge curves in an electrochemical capacitor according to Example 3-2 of the invention.

With regard to the fabricated electrochemical capacitors of Example 3-2 and Comparative example 3-2, 1 mA constant current charge and discharge was performed. The results are shown in FIG. 8. As shown in FIG. 8, it was confirmed that according to Example 3-2, as in Example 3-1, a high voltage could be applied and a high energy density could be obtained compared to in Comparative example 3-2 including no compound B. That is, it was found that when the electrolyte 11 including the compound B having the =NCOH group was used, the energy density could be improved regardless that the compound A of n=1 was used or other electrode material was used.

While the invention has been described with reference to the embodiments and examples, the invention is not limited to the foregoing embodiments and examples, and various modifications may be made. For example, in the foregoing embodiments and examples, descriptions have been given of the compounds A and C with the specific examples. However, other compound can be used, as long as the compound has the component R1 and the protic dissociation group X or the cationic dissociation group Z, which is bonded to this component R1.

Further, in the foregoing embodiments and examples, descriptions have been given of the compound B with the specific examples. However, other compound can be used, as long as the compound has the structure expressed as Chemical formula 18.

Further, in the foregoing embodiments and examples, specific descriptions have been given of the methods of manufacturing the proton conductor and the single ion conductor of the invention. However, the proton conductor and the single ion conductor of the invention can be manufactured by other method.

As described above, according to the proton conductor or the single ion conductor of the invention, the compound having the structural part expressed as Chemical formula 1 or Chemical formula 3, and the compound having the structure expressed as Chemical formula 2 or Chemical formula 4 are included. Therefore, by action of the =NCOH group of the compound having the structure expressed as Chemical formula 2 or Chemical formula 4, protons or cations can be dissociated and migrated. Therefore, proton conductivity or ion conductivity can be obtained in a broad temperature range, and only protons or cations can be migrated. Further, the proton conductor and the single ion conductor can be easily formed into a film or the like. Further, with regard to the proton conductor, water retention can become unnecessary.

In particular, according to the proton conductor or the single ion conductor of the invention, when the mole ratio of the compound having the structure expressed as Chemical formula 2 or Chemical formula 4 to the protic dissociation group or the cationic dissociation group is in the range from 10 to 30, proton conductivity or ion conductivity can be further improved.

Further, according to the method of manufacturing a proton conductor or the method of manufacturing a single ion conductor of the invention, the compound having the structure expressed as Chemical formula 1 is impregnated in the compound having the structure expressed as Chemical formula 2 or in the solution obtained by dissolving the compound having the structure expressed as Chemical formula 2 in the solvent. Otherwise, the compound having the structural part expressed as Chemical formula 1 and the compound having the structure expressed as Chemical formula 2 are mixed in the solvent, and the solvent is evaporated. Otherwise, the compound having the structural part expressed as Chemical formula 3 is impregnated in the compound having the structure expressed as Chemical formula 4 or in the solution obtained by dissolving the compound having the structure expressed as Chemical formula 4 in the solvent. Otherwise, the compound having the structural part expressed as Chemical formula 3 and the compound having the structure expressed as Chemical formula 4 are mixed in the solvent, and the solvent is evaporated. Therefore, the proton conductor or the single ion conductor of the invention can be simply and uniformly manufactured.

Further, according to the electrochemical capacitor of the invention, the proton conductor of the invention is used as the electrolyte. Therefore, the electrochemical capacitor can be used even in the high temperature range, high temperature treatment can be preformed even during manufacture, and manufacturing the electrochemical capacitor can be facilitated. Further, it becomes possible to apply a high voltage, and the energy density can be improved.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

TABLE 1

| | Protic dissociation group X | Compound B | Introduction amount of compound B | Mole ratio of compound B to protic dissociation group X (b/(a × n)) | Proton conductivity ($\times 10^{-4}$ (S/cm)) | | |
|---|---|---|---|---|---|---|---|
| | | | | | 70° C. | 23° C. | −20° C. |
| Example 1-1 | —SO$_3$H | DMF | 0.57 | 20.1 | 9.0 | 5.0 | 2.0 |
| Example 1-2 | —COOH | DMF + MF | 0.48 | 13.8 | 6.0 | 4.0 | 1.5 |
| Example 1-3 | —SO$_3$H | BF | 0.42 | 10.0 | 4.0 | 1.7 | 0.40 |
| Example 1-4 | —COOH | MF | 0.71 | 37.6 | 1.5 | 0.40 | 0.04 |
| Comparative example 1-1 | —COOH | Butyl formate | 0.38* | 11.2* | 0.12 | 0.08 | 0.03 |

*The introduction amount and the mole ratio of butyl formate are shown for reference.

TABLE 2

| | Cationic dissociation group Z | Compound B | Introduction amount of compound B | Mole ratio of compound B to cationic dissociation group Z (b/(c × n)) | Proton conductivity ($\times 10^{-5}$ (S/cm)) | | |
|---|---|---|---|---|---|---|---|
| | | | | | 70° C. | 23° C. | −20° C. |
| Example 2-1 | —SO$_3$Li | DMF | 0.52 | 16.3 | 7.5 | 3.0 | 1.7 |
| Example 2-2 | —SO$_3$Li | MF | 0.47 | 13.2 | 6.9 | 2.8 | 1.9 |
| Comparative example 2-1 | —SO$_3$Li | Butyl formate | 0.40* | 10.0* | 0.04 | 0.025 | 0.018 |

*The introduction amount and the mole ratio of butyl formate are shown for reference.

TABLE 3

| | Electrode material | Electrolyte | |
| --- | --- | --- | --- |
| | | Compound A | Compound B |
| Example 3-1 | Polyaniline | Perfluoro sulfonic acid macromolecule | N,N-dimethyl formamide |
| Comparative example 3-1 | Polyaniline | Perfluoro sulfonic acid macromolecule | — |

TABLE 4

| | Electrode material | Electrolyte | |
| --- | --- | --- | --- |
| | | Compound A | Compound B |
| Example 3-2 | Ruthenium oxide | Trifluoro metane sulfonic acid | N,N-dimethyl formamide |
| Comparative example 3-2 | Ruthenium oxide | Sulfuric acid | — |

The invention claimed is:

1. A proton conductor, including an impregnated complex composed of:

a first compound having a first structural part having a first formula:

where R1 represents a component including carbon, X represents a protoic dissociation group, and n≧1; and a second compound having a second structural part having a second formula:

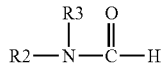

where R2 and R3 represent a component including carbon or hydrogen, respectively, wherein a number of moles of the first compound is a, a number of moles of the second compound is b, and a ratio of the number of moles b to the number of moles of the protoic dissociation group (a×n) is greater than or equal to 10 and less than or equal to 30, wherein the first compound is a film into which the second compound is impregnated.

2. A proton conductor according to claim 1, wherein the second compound includes at least one of N, N-dimethyl formamide and N-methyl formamide.

3. A proton conductor according to claim 1, wherein the protoic dissociation group is at least one of a —SO₃H group, a —COOH group, and a —OH group.

4. A proton conductor according to claim 1, wherein upon application of an electric field, the =NCOH group of the second compound interacts with the protoic dissociation group and causes a proton of the protoic dissociation group to dissociate from the first compound.

* * * * *